Aug. 16, 1955 I. B. BICKLER 2,715,518
HEAT CONDUCTING SHOCK MOUNT
Filed Jan. 8, 1953
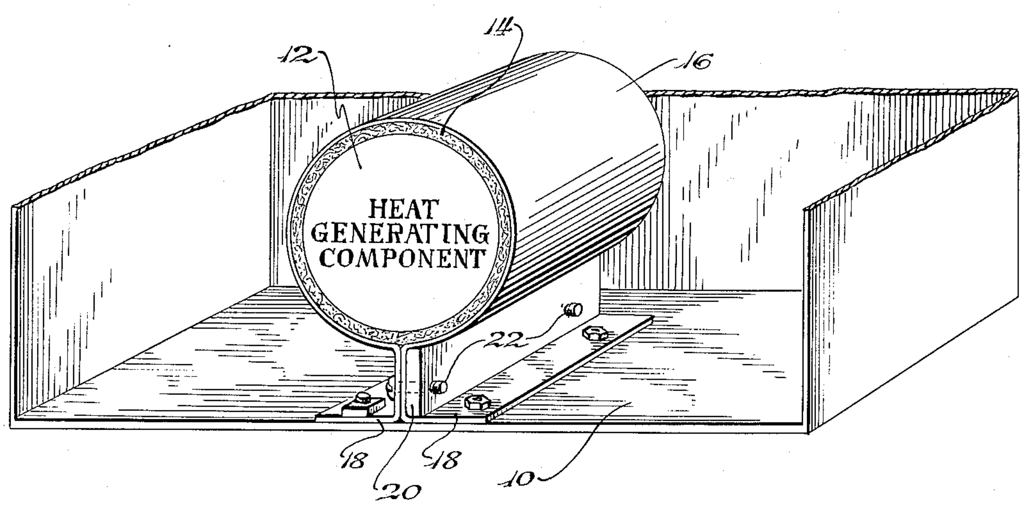
Inventor:
Irving B. Bickler
By Ahlberg, Wupper & Gradolph
Attorneys.

2,715,518

HEAT CONDUCTING SHOCK MOUNT

Irving B. Bickler, Chicago, Ill., assignor to Stewart-Warner Corporation, Chicago, Ill., a corporation of Virginia Application January 8, 1953, Serial No. 330,297

4 Claims. (Cl. 257—261)

My invention relates generally to shock mounts, and more particularly to such mounts which are capable of providing a good heat conducting path for heat generating components of electronic equipment, such as power supply tubes, power amplifying tubes, and the like.

The problem of heat dissipation in connection with the use of electronic equipment which is closely packed and encased in a pressure-tight outer container is serious, because there is difficulty in securing effective circulation of air within the container or casing. In an endeavor to solve this problem, metal encased electic and electronic components have frequently been provided with fins on their outer surfaces to provide greater contact between the case and the surrounding atmosphere. This is normally of considerable help, but is not effective unless there is good circulation of air within the container.

Another method which has been proposed to solve this problem is to mount the component on a large metal surface, and, depending upon the radiation of the heat from the surface to the surrounding atmosphere, to provide adequate heat dissipation from the heat generating component. The outer container itself provides such a large metal surface and has been used for this purpose.

However, in many electronic applications, it frequently becomes necessary to provide some sort of resilient mounting to absorb any violent shock or vibration to which the entire apparatus may be subjected. Rubber, neoprene, or silastic are used for this purpose, but they are very poor heat conductors and must be applied at the very contact areas where the greatest heat transfer is desired, that is, between the heat generating component and the outer casing.

To overcome these difficulties, I have provided an improved heat conducting shock mount shown in the accompanying drawing, which is an isometric view of an illustrative embodiment of the invention.

A casing 10 for electronic equipment, which may be of any desired size or shape to house the equipment, is sealed to maintain pressure within it, particularly when the equipment is to be used on aircraft. This electronic equipment may have one or more heat generating components 12 therein, such as vacuum tubes in power circuits, which might be damaged by shock or vibration. It is therefore surrounded by a layer 14 of copper wool or similar good heat conductor having reasonably good elastic properties. This layer of copper wool is enclosed in a cylindrical shell or sheath 16, preferably also of copper, having mounting flanges 18 integral therewith.

In order to increase the heat conductance between the shell 16 and the casing 10, a bar 20 of copper or the like is clamped to the depending portions of the mounting flanges 18, this bar being of such width that its edges engage the shell 16 as well as the horizontal portions of the mounting flanges 18.

Screws 22 threaded in the bar 20 tightly clamp the depending portions of the mounting flanges 18 together and against the bar, while the horizontal portions of the mounting flanges 18 are suitably clamped to the casing

10. Other means, such as brazing, soldering, or welding, may be employed to secure the parts 16, 18, and 20 in assembled relation and to secure the horizontal portions of the flanges 18 to the inner wall of the casing 10.

By the use of a heat conducting layer of a metal which is a good conductor of heat, formed in interlaced filaments of such small size that they form a mat providing substantial elasticity, such as the use of copper wool for this purpose, and packing the copper wool in a space between a heat generating component and a copper sheath which is in good heat conducting relationship with the casing, there has been a substantial improvement in means for maintaining heat generating components of electronic equipment at a safe operating temperature, while at the same time providing adequate protection against the transmission of vibration and shocks from the casing to the component.

The shock mount shown and described does not materially interfere with the removal and replacement of the electronic components should this become necessary. The heat conducting metallic wool may be easily packed between the component and shell 16. If the component 12 is of irregular shape, the shell 16 should, to the extent that it is convenient, conform to the shape of the parts of the component from which heat is to be dissipated, leaving adequate space for the reception of the heat conducting, shock and vibration insulating metallic wool.

As shown, the mount insulates the component against shock in any direction because the copper wool will yield if the forces due to the shock have a component longitudinally of the component, yet will frictionally adhere to the surfaces of the component and of the sheath 16. The ends, or one end, of the sheath 16 might be closed, or partially closed, and copper wool packed between such closure and the electronic component.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a heat conducting shock mount for a heat generating component of electronic equipment enclosed in a metallic container, the combination of a copper sheath surrounding the component and having internal dimensions substantially greater than the corresponding external dimensions of the component, a layer of copper wool packed in the space between the component and the sheath and supporting the component, good heat conducting mounting flanges integral with the sheath and securing the latter to a wall of the container, and a copper bar secured to the mounting flanges to provide additional heat conducting material between the sheath and the wall of the container.

2. In a heat conducting shock mount for a heat generating component of electrical equipment enclosed in a metallic container, the combination of a metallic sheath of good heat conducting properties surrounding the heat generating portion of the component and having internal dimensions substantially greater than the corresponding external dimensions of the component, a layer of metallic wool packed in the space between the component and the sheath and supporting the component, metallic support and heat conducting means connecting the sheath to the adjacent wall of the container, and said metallic support and heat conducting means being shaped and dimensioned to have a length substantially equal to that of said sheath and a transverse thickness several times greater than the thickness of the sheath structure to rapidly transmit heat from the sheath to the container wall.

3. An assembly of electrical structure comprising, in combination, an elongated electrical element which generates heat as an incident to its normal operation, a resilient layer of metallic strands surrounding the heat generating portion of the element in firm engagement therewith, a metallic shell extending along substantially the entire length of the heat generating portion of the element and encircling the resilient layer in firm engagement therewith, a heat dissipating support adjacent the shell, and metallic connecting means attaching the shell to the heat dissipating support and dimensioned to form a heat conducting path of high thermal conductivity between the shell and the support.

4. In electrical apparatus, the combination of an electrical element which generates heat as an incident to its normal operation, a metallic sheath encircling the heat generating portion of the electrical element in radially spaced relation thereto and extending along substantially the entire length of said heat generating portion, a layer of resilient material of good heat conducting properties encircling said heat generating portion of the electrical element between the latter and the surrounding sheath, the resilient layer extending along substantially the entire length of said heat generating portion of the element and having firm contact with both the outer surface of the electrical element and the inner surface of the sheath, and metallic attaching means having a transverse section of substantial area connected with said sheath and extending therefrom to support the sheath and carry away the heat transmitted thereto through said resilient layer from the electrical element.

References Cited in the file of this patent

UNITED STATES PATENTS

| | | |
|---|---|---|
| 1,817,355 | Elliott | Aug. 4, 1931 |
| 1,963,945 | Lyman et al. | June 19, 1934 |
| 2,313,379 | Wood | Mar. 9, 1943 |
| 2,330,632 | Seligman | Sept. 28, 1943 |
| 2,398,595 | Powell et al. | Apr. 16, 1946 |
| 2,497,963 | Singer | Feb. 21, 1950 |

FOREIGN PATENTS

| | | |
|---|---|---|
| 637,898 | Germany | Nov. 6, 1936 |